UNITED STATES PATENT OFFICE.

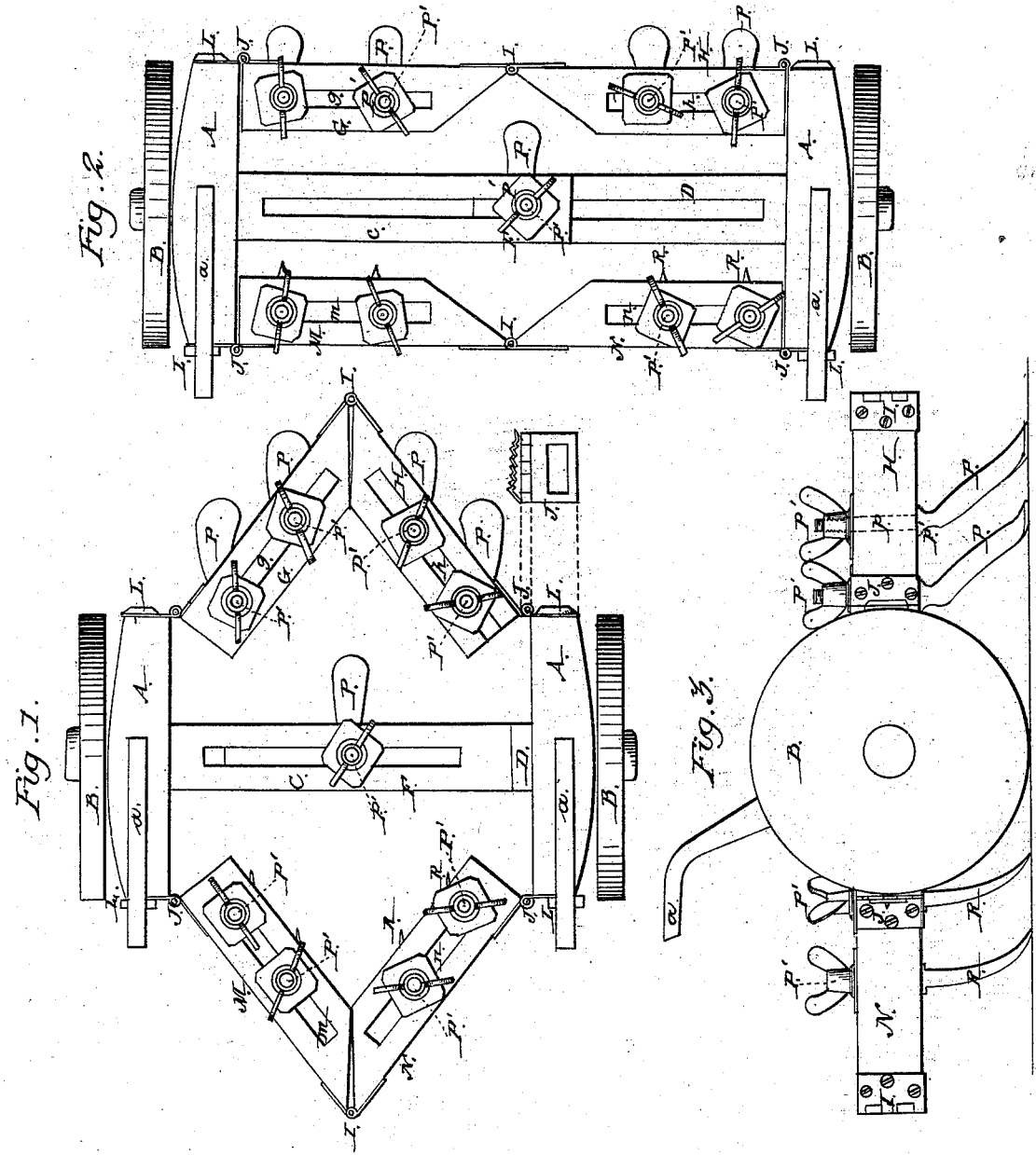

ALMON WILLIAMS, OF BEREA, OHIO.

IMPROVEMENT IN CULTIVATORS.

Specification forming part of Letters Patent No. 43,249, dated June 21, 1864.

*To all whom it may concern:*

Be it known that I, ALMON WILLIAMS, of Berea, in the county of Cuyahoga and State of Ohio, have invented certain new and useful Improvements in Cultivators; and I do hereby declare that the following is a full and complete description of the construction and operation of the same, reference being had to the accompanying drawings, making a part of this specification, in which—

Figure 1 is a top view. Fig. 2 is a top view of the cultivator in a different position from that in Fig. 1. Fig. 3 is a side elevation of Fig. 1.

Like letters of reference indicate like parts.

The nature of my invention relates to a cultivator so constructed and arranged that it can be expanded or contracted as may be desired to suit the width of the rows, and the cultivators and teeth are adjusted in the frame and can be moved and placed in any desired position, and they can also be adjusted to extend any distance below the ground.

In Figs. 1 and 2, A represents pieces at the sides of the cultivator to which the axles of wheels B are secured.

C and D are slotted frames forming a reach or axle, F, in the center, one end of each piece being permanently secured to the center of the side pieces, A.

G and H are slotted frames at the front end of the cultivator, hinged together at I, as represented. Each frame also is hinged to the ends of the side pieces at J. The part of the hinges J that is connected to the ends of the side pieces, A, is slotted as represented, so that by means of the screw-bolts L the frames G and H can be raised or lowered as may be desired.

The rear end of the cultivator consists of slotted frames M and N, similar to G and H, hinged together in the center and to the ends of the side pieces in the same way.

In the slots $g$ $h$ of the frames G H are secured the cultivators P by means of screws or nuts P′, which are screwed onto the shank of each cultivator that extends up through the slot in the frame, as indicated by the dotted lines $p$ in Fig. 2, a collar, $p'$, being below the frame and washers above, as represented. In the slots $m$ $n$ at the rear end of the frame are secured in a similar manner the teeth or cultivators R. In the middle of the slotted pieces C D of the reach is secured a cultivator, P, that operates midway between the two in front; and the screw and nut that fasten the cultivator also keep the free ends of the pieces C D permanently in place when adjusted to any position.

$a$ $a$ are the handles of the cultivator, secured to the side pieces, A.

From the construction of this cultivator it is rendered adjustable in every way that can be desired. By means of the hinges I and J, and by lengthening the reach F in the center, the frames G H and C D at the ends can be set at any angle from that represented in Fig. 1 till they are extended out straight or parallel, as in Fig. 2, the screw and nut in the center firmly securing them in any position; and as the cultivators are adjustable in the frames, as described, they can readily be adjusted to suit the position of the frames at whatever angle they may be placed. The object of having the frames and cultivators thus adjustable is that the cultivators P and teeth R may be adapted to suit the width of any rows that are to be cultivated.

By means of the slotted hinges J at the ends of the side pieces and bolts L the cultivators can be raised or lowered to any desired depth in the ground, and in passing over an inclined or uneven surface one side can be lowered more than the other, that all parts may be cultived alike.

The team can be attached to the front end of this machine by any of the ordinary methods.

What I claim as my improvement, and desire to secure by Letters Patent, is—

The adjustable reach F, the slotted hinged frames G H and M N, in combination with the teeth or cultivators and slotted hinges J, in the manner and for the purpose set forth.

A. WILLIAMS.

Witnesses:
J. BRAINERD,
W. H. BURRIDGE.